US008800863B2

(12) United States Patent
Colley

(10) Patent No.: US 8,800,863 B2
(45) Date of Patent: Aug. 12, 2014

(54) MEDIA DISPENSING

(75) Inventor: Andrew Colley, Dundee (GB)

(73) Assignee: NCR Corporation, Duluth, GA (US)

( * ) Notice: Subject to any disclaimer, the term of this patent is extended or adjusted under 35 U.S.C. 154(b) by 322 days.

(21) Appl. No.: 13/326,862

(22) Filed: Dec. 15, 2011

(65) Prior Publication Data

US 2013/0158702 A1 Jun. 20, 2013

(51) Int. Cl.
*G06Q 40/00* (2012.01)
*G07D 11/00* (2006.01)
*G07F 19/00* (2006.01)

(52) U.S. Cl.
USPC .......................................... 235/379; 235/381

(58) Field of Classification Search
CPC ..... G07F 19/20; G07F 19/211; G07F 19/201; G07F 19/205; G07F 19/202; G06Q 20/18; G06Q 20/20
USPC .................................................. 235/379–383
See application file for complete search history.

(56) References Cited

U.S. PATENT DOCUMENTS

| | | | | |
|---|---|---|---|---|
| 6,061,666 | A * | 5/2000 | Do et al. | 705/43 |
| 2003/0133458 | A1* | 7/2003 | Sato et al. | 370/395.6 |
| 2004/0222295 | A1* | 11/2004 | Magee et al. | 235/381 |
| 2006/0267857 | A1* | 11/2006 | Zhang et al. | 345/1.1 |
| 2007/0102509 | A1* | 5/2007 | Magee et al. | 235/379 |
| 2010/0275267 | A1* | 10/2010 | Walker et al. | 726/26 |
| 2012/0286032 | A1* | 11/2012 | Schuster et al. | 235/379 |

* cited by examiner

*Primary Examiner* — Tuyen K Vo
(74) *Attorney, Agent, or Firm* — Paul W. Martin

(57) ABSTRACT

A method and apparatus are disclosed for dispensing at least one item of media from one of a plurality of possible media dispensing ports. The apparatus includes a user interface comprising a user display, an intermediate display adjacent to the user display and a port location display adjacent to the intermediate display and adjacent to a plurality of possible media dispensing ports. Each display is arranged to selectively display a visual cue to direct a user to a selected one of the possible media dispensing ports.

14 Claims, 6 Drawing Sheets

MEDIA DISPENSING

FIELD OF THE INVENTION

The present invention relates to a method and apparatus for dispensing or depositing at least one item of media at one of many media dispensing ports. In particular, but not exclusively, the present invention relates to how currency notes and/or checks and/or coins or tokens and/or DVDs may be deposited or dispensed at a terminal which gives a visual cue to direct a user to a selected one of the many possible ports. Providing a visual cue helps improve customer satisfaction and avoids user error.

BACKGROUND TO THE INVENTION

Media depositories and media dispensers are known. Media depositories are used to receive media items from a customer. One common type of media depository is a sheet media depository for receiving items of media in sheet form. For example, such items of media can be currency notes, checks, tickets, giros, receipts or the like.

Sheet media depositories are utilized in automated teller machines (ATMs) and other such self-service terminals. Some sheet depositories are capable of receiving a bunch of sheets at a user input port and then picking individual sheets from the bunch so that each sheet can then be identified and validated prior to storage of a validated sheet within a depository or returned to a customer. Bunches of items of media such as currency notes and/or checks are thus deposited by a user and, subsequent to a user agreement step and item verification step, these items are stored semi-permanently within a self-service terminal until security staff or bank staff come to empty the storage unit. The storage unit is sometimes referred to as a stacking bin. Alternatively, when an input item is identified as being an illicit or damaged item, the item is stored in a storage unit referred to as a reject bin.

Media dispensers are known in which a user visits an ATM or other such self-service terminal and requests one or more items of media. For example, the user may request a certain sum of currency notes. The currency notes or other such items of media are held in secure modules within a multi-media station and are picked one-by-one according to user input. These picked items are then transported along a transport pathway within the terminal to an exit port where a user gains access to the requested items.

Other non-sheetlike items such as coins, tokens, DVDs or the like may also be deposited or dispensed at one or more appropriate ports.

The link between a user interface and multi-media station when dispensing or depositing media is often difficult for a customer to comprehend. Users often require guidance to the appropriate input or output ports of which there may be many. Certain solutions to this problem have been suggested such as the use of decals or other such signs or stickers, media entry and exit indicators (MEEIs) or other such light or audio indicators which in some way provide a visual and/or audible cue to a user. Such cues are used by a user to recognize one of potentially many slots where items are to be deposited and likewise identify one of potentially many ports where items are to be dispensed.

Nevertheless, a user can be faced with a complex and confusing interface which is prone to user error and may lead to customer dissatisfaction.

SUMMARY OF THE INVENTION

It is an aim of the present invention to at least partly mitigate the above-mentioned problems.

It is an aim of certain embodiments of the present invention to provide a method and apparatus for dispensing or depositing at least one item of media at one of many possible media dispensing ports.

It is an aim of certain embodiments of the present invention to provide a physical and/or digital link between dispensing interfaces and onscreen content at a user display.

It is an aim of certain embodiments of the present invention to provide a combination of onscreen user interface designs together with adjacent displays or other mechanisms able to provide a visual cue so that a user is clearly directed to one or more media ports.

It is an aim of certain embodiments of the present invention to provide a user interface screen which is accessible to a user and which connects to a conventional multi-media station and which allows the screen content to be linked dynamically and/or pictorially to the media ports of the multi-media station which may thus be considered abstracted from the user display screen.

According to a first aspect of the present invention, there is provided apparatus for dispensing at least one item of media from one of a plurality of possible media dispensing ports, comprising:

a user interface comprising a user display;

an intermediate display adjacent to the user display; and a port location display adjacent to the intermediate display and adjacent to a plurality of possible media dispensing ports; wherein each display is arranged to selectively display a visual cue to direct a user to a selected one of the possible media dispensing ports.

Aptly, each display is arranged to display a respective visual cue in a pre-determined sequence.

Aptly, the displayed visual cues on at least the user display and port location display are selected from a plurality of possible visual cues responsive to a type of media being dispensed.

Aptly, the user display comprises a touch screen.

Aptly, the intermediate display comprises a panel region in a first plane and a further panel region in a further plane substantially perpendicular to the first plane, each panel region comprising a plurality of pixels that selectively illuminate.

Aptly, the port location display comprises an electronic visual display.

Aptly, the apparatus further includes at least one light source proximate to each dispensing port, the light source associated with the selected one dispensing port being arranged to illuminate responsive to the display of a visual cue on the port location display.

Aptly, the apparatus further includes a wall element comprising the media dispensing ports, said wall element facing a direction substantially perpendicular to a direction faced by the user display.

According to a second aspect of the present invention, there is provided an automated teller machine (ATM) comprising apparatus for dispensing at least one item of media from one of a plurality of possible media dispensing ports, comprising:

a user interface comprising a user display;

an intermediate display adjacent to the user display; and a port location display adjacent to the intermediate display and adjacent to a plurality of possible media dispensing ports; wherein each display is arranged to selectively display a visual cue to direct a user to a selected one of the possible media dispensing ports, wherein a first media dispensing port comprises a currency note dispensing port and a second media dispensing port comprises a printed receipt dispensing port.

According to a third aspect of the present invention there is provided a method of dispensing at least one item of media from one of a plurality of possible media dispensing ports, comprising the steps of:

via a user interface comprising a user display, providing a user with a choice of items to be dispensed, each item being associated with a respective one of a plurality of possible media dispensing ports;

displaying a visual cue on the user display responsive to selection of an item;

displaying a visual cue on an intermediate display adjacent to the user display; and displaying a visual cue on a port location display adjacent to the intermediate display and adjacent to the plurality of possible media dispensing ports thereby indicating the media dispensing port associated with the selected item.

Aptly, the method further includes the steps of starting to display the visual cue on the port location display subsequent to the display of the visible cue on the intermediate display; and starting to display the visible cue on the intermediate display subsequent to the display of the visible cue on the user display.

Aptly, the step of displaying a visual cue on the user display comprises displaying an image of said an item on a region of a touch screen.

Aptly, the step of displaying a visual cue on the port location display comprises displaying a moving image on an electronic visual display, said moving image moving in a direction towards said the media dispensing port.

According to a fourth aspect of the present invention, there is provided a product which comprises a computer program comprising program instructions for:

via a user interface comprising a user display, providing a user with a choice of items to be dispensed, each item being associated with a respective one of a plurality of possible media dispensing ports;

displaying a visual cue on the user display responsive to selection of an item;

displaying a visual cue on an intermediate display adjacent to the user display; and displaying a visual cue on a port location display adjacent to the intermediate display and adjacent to the plurality of possible media dispensing ports thereby indicating the media dispensing port associated with the selected item.

According to a fifth aspect of the present invention, there is provided a method of dispensing or depositing items of media at one of a plurality of media ports, comprising the steps of:

responsive to a user selecting a transaction item type, providing at least one visible and/or audible cue to the user extending across multiple displays to identify a media port associated with the item type.

Certain embodiments of the present invention provide a visual cue which assists a user of a user interface in identifying a selected one of many possible media dispensing or depositing ports.

Certain embodiments of the present invention provide a mechanism for drawing a user's attention from a region of a user display screen to a one of many possible media dispensing ports. The mechanism by which the user's attention is drawn to the selected one port is user-friendly and not prone to user error.

Certain embodiments of the present invention provide an effective way of linking content to media interfaces without a need for a single user slot to be provided in a media interface rendered on the same plane as that of a remainder of the user interface. This helps enhance usability and customer/consumer experience.

Certain embodiments of the present invention provide a series of visual cues in a sequence. The timing of the generated visual cues helps direct a user to a particular port.

Certain embodiments of the present invention provide visual cues that themselves are associated with a particular type of item that is to be dispensed or deposited. This assists a user identify a particular port being used for a transaction.

BRIEF DESCRIPTION OF DRAWINGS

Embodiments of the present invention will now be described hereinafter, by way of example only, with reference to the accompanying drawings in which.

DESCRIPTION OF EMBODIMENTS

Figure 1:
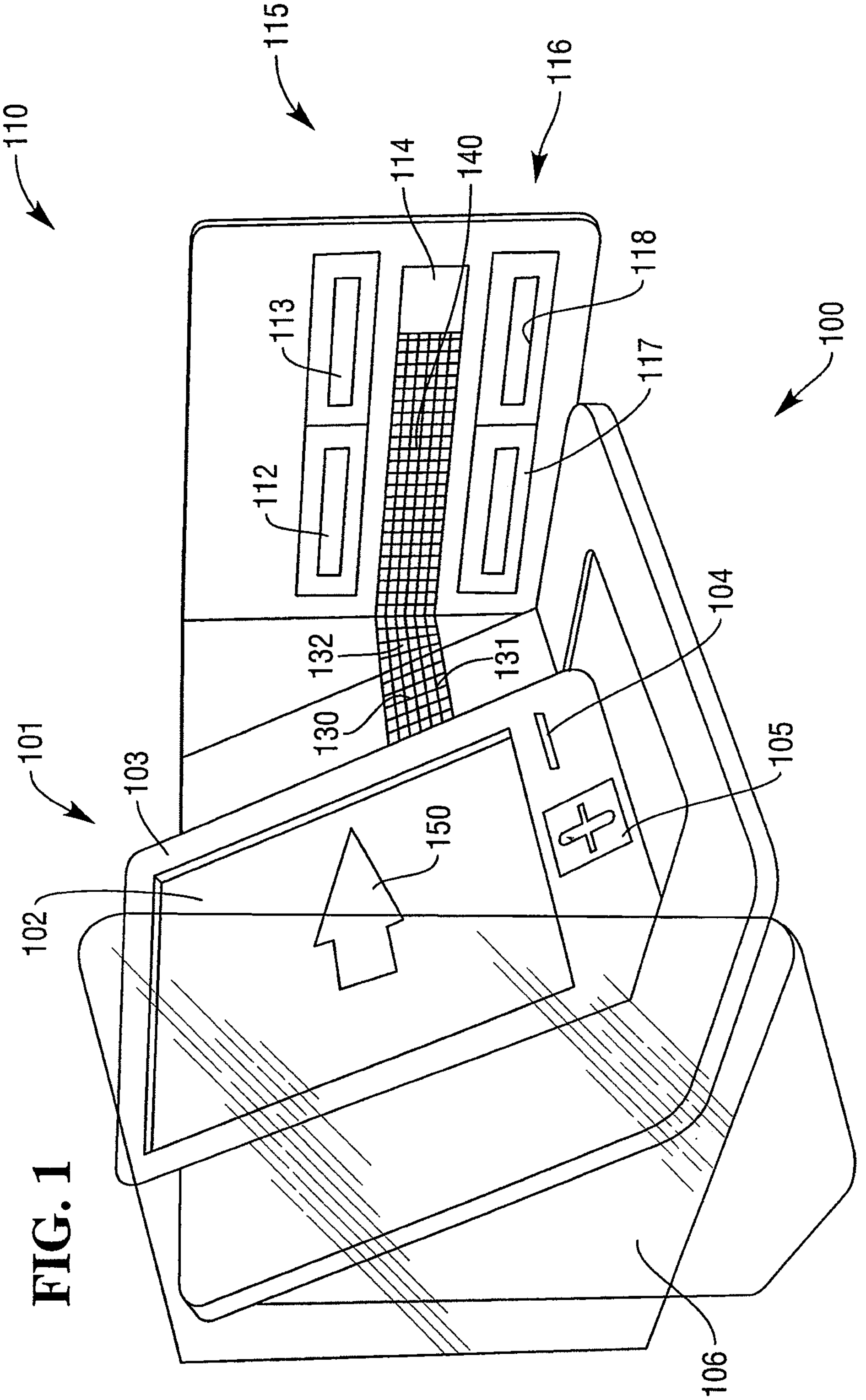
FIG. 1 is a schematic diagram of an ATM according to an embodiment of the present invention.

In the drawings like reference numerals refer to like parts.

FIG. 1 illustrates an automated teller machine (ATM) 100 according to an embodiment of the present invention. The ATM includes a user interface 101 which includes a user display provided as a touch screen display 102. The touch screen display 102 displays imagery including lettering, wording, blocks, icons, numbers or the like and receives user input by a user touching the touch screen 102 at an appropriate position thereby selecting desired subject matter associated with respective options. The touch screen is provided in a frame 103 which extends around the screen and includes a card slot 104 into which a user visiting the ATM locates an associated card. A user identification device such as a finger print scanner 105 is also provided in the screen. Other types of security mechanisms such as a touch keypad for input of a personal identification number (PIN) can of course optionally or additionally be provided.

A courtesy screen 106 is arranged to one side of the frame. The courtesy screen 106 is opaque or at least partially clouded to provide a customer visiting the ATM with privacy when inputting user data and making choices.

The user interface 101 extends out of an adjacent wall 110. Media depositories and media dispensers are located behind the wall 110 (not shown) and connected to media input and output slots in the wall. The wall thus provides a user standing at the user interface with access to multiple media dispensing ports. For example, as shown in FIG. 1, a first media dispensing port 112 is utilized to dispense currency notes. A further media dispensing port 113 is used to dispense printed receipts and a third media dispensing port is provided to dispense coins. The media dispensing ports along a top row 115 thus are utilized to dispense sheet-like items of media to a customer. These may be currency notes, vouchers or the like. The middle row media dispensing port 114 however, dispenses items of media which are not sheet-like but rather are coins or metallic tokens or the like.

A lower row 116 of media ports is a row of deposit ports whereby a user can deposit items. For example, a first port 117 in the lower row 116 is a currency note or check deposit media port. A customer may present one or a bunch of sheet-like items of media at this port which are then moved into a multi-media station behind the wall and processed. The second port 118 in the lower row of ports is a coin deposit port 118 via which a user may deposit multiple coins which are thereafter processed.

The user interface 101 includes a main user display 102. Adjacent to this user display is an intermediate display 130. This display includes a first panel 131 which is substantially aligned with and in the same plane as the primary user display 102 and a secondary panel 132 which is substantially in the plane of the wall 110 and thus the possible media dispensing/deposit ports.

A further display 140 also lies substantially aligned with the plane of the wall 110. This third display is used to identify ports utilized during a transaction and is adjacent to the intermediate display 130 and adjacent to the plurality of possible media dispensing and media deposit ports.

Either the primary user display 102 and/or the intermediate display 130 and/or the port location display 140 can be utilized to display visual cues which assist a user carrying out a transaction at the user interface to identify a dispensing port where the ATM will dispense a requested item or a deposit port where a user should locate an item which is to be deposited. The range of visible cues which can be provided is almost unlimited. For example, an arrow 150 may be displayed on a primary user display and further arrows (not shown in FIG. 1) sequentially generated on the intermediate display 130 which leads around a corner region with the arrow continuing by being displayed on the port location display. The arrow displayed as a visual cue can be generated on the display in a way which points ultimately to a selected one of the possible media ports.

It will be understood that rather than having dedicated dispensing or depositing ports, that each of the multiple ports may optionally permit a dispensing and depositing mode of operation. That is to say, a user may deposit currency notes at a selected one port and also have currency notes dispensed to the user via that port. Likewise, a port for dispensing and depositing checks may be provided. Likewise, a port for depositing and dispensing coins may be provided. Likewise, a port for dispensing and depositing vouchers may be provided. Aptly, one or more of the ports dispenses printed subject matter such as receipts or the like.

Figure 2:
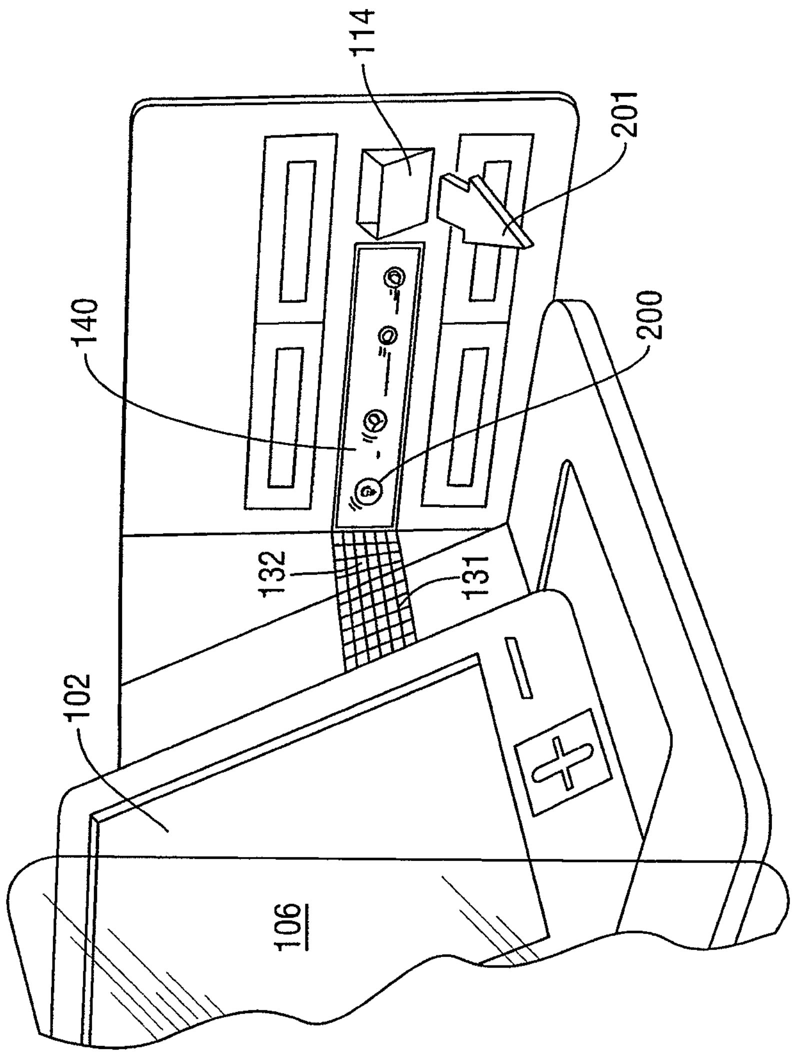
FIG. 2 illustrates a visual cue displayed on a port indicating a display of the ATM.

FIG. 2 illustrates the user interface whereby a user has requested, via the display screen, that a sum of money in coins is to be dispensed. In order to initiate this operation, a user visits the ATM, verifies their identity and then selects a particular sum of money to be withdrawn from their account in coins. Subsequent to a final check being displayed on the primary display 102, a user is requested to confirm the request for coins. This may be confirmed by pressing on the touch screen 102. Thereafter, a visual cue is displayed sequentially, firstly on the touch screen display 102, then on the first panel 131 of the intermediate display 130, then on the secondary panel 132 of the intermediate display 130 and then on the port location display 140. In each instance, the visual cue displayed is optionally selected according to a type of item to be dispensed or deposited. In the example shown in FIG. 2 in which a user wishes coins to be dispensed, an image of a coin 200 is shown. This can be made to roll from the primary user display 102 across the length of the intermediate display and along the longitudinal length of the port location display 140 towards the coin dispensing port 114. Subsequent to a user's attention being directed to the coin dispensing port 114, coins are ejected into the port 114 and may thereafter be removed by a user, indicated by the removal arrow 201.

Figure 3:
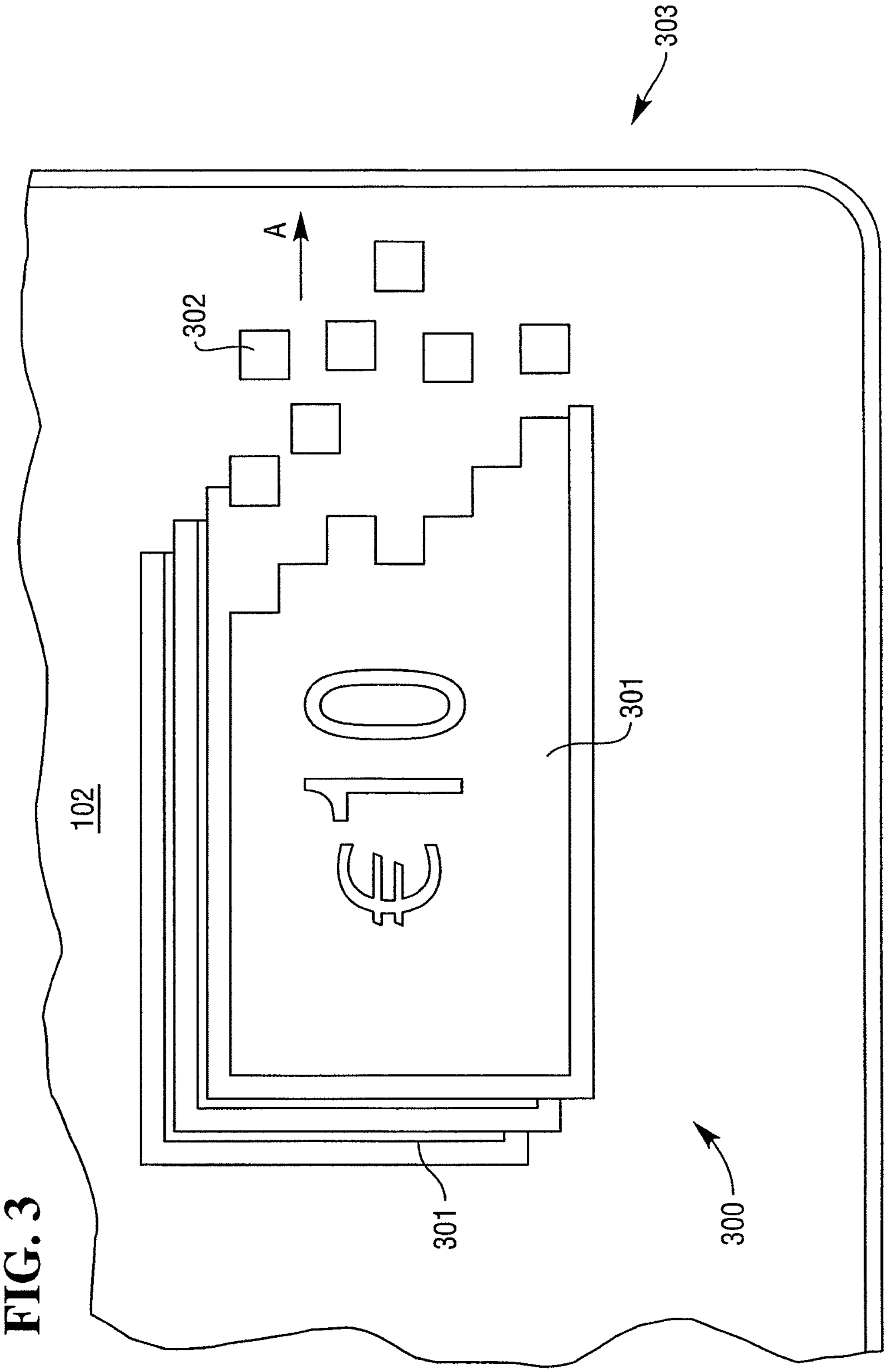
FIG. 3 illustrates display of a visual cue on a primary user display.

FIG. 3 illustrates another method in which a visual cue may be provided to a user of an ATM to assist that user to determine which of a possible plurality of ports is to be utilized in a transaction. FIG. 3 helps illustrate a region 300 of the primary user display 102. The region 300 displayed is a bottom right hand corner of the touch screen and this is utilized to display an image of currency notes 301. It will be appreciated that a visual cue or visual cues may be displayed at any desired region of the user display. This may occur subsequent to a user at the user interface requesting a sum of money. For example, thirty Euros. Images of three ten Euro notes 301 are displayed on the screen in an initial phase and then the display gradually pixelates the notes displayed. That is to say, step by step the notes are split into multiple checker board pieces. To a user this indicates that the selected item is selected and a dispensing mode of operation has been initiated. The pixelated parts 302 of the notes 301 move across the screen to the right hand side shown in FIG. 3. That is to say, towards the intermediate display 130.

Figure 4:
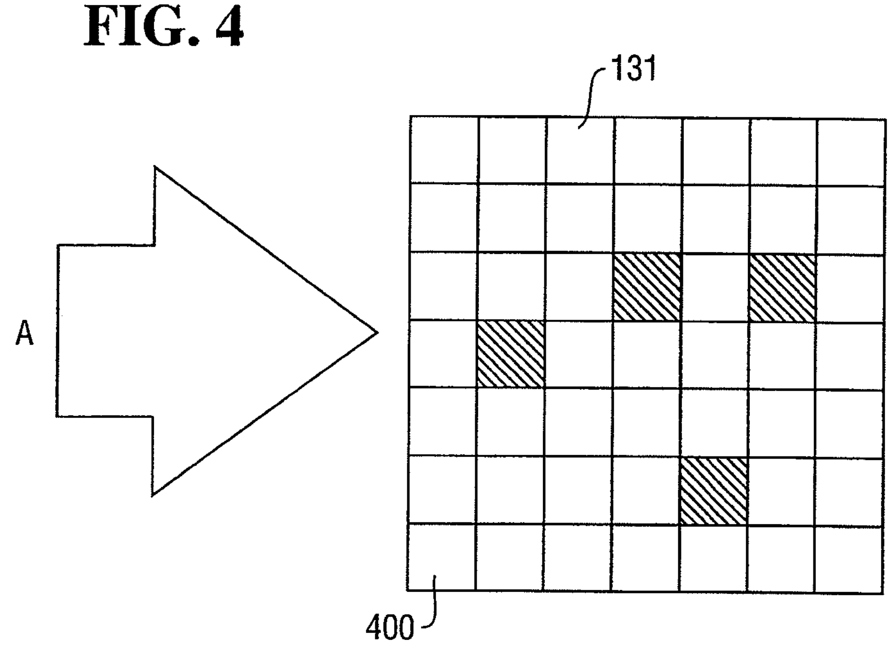
FIG. 4 illustrates display of a visual cue on an intermediate display.

FIG. 4 illustrates the first panel 131 of the intermediate display 130 in more detail. This display can be an electronic display device or may merely be a checker board arrangement of illuminating units 400. These units are set out in an array of columns and rows. As the pixelated parts 302 of the currency notes displayed on the touch screen display move toward a border region 303 of the primary display, the units 400 on the first panel of the intermediate display are selectively illuminated. The selection of which unit or units is to be illuminated and when and where is made so that it appears that the pixelated parts from the primary user display are moving onto the intermediate display. Thereafter, illumination takes place consecutively along a row to give the appearance of a moving part. It will be appreciated that whilst not shown in FIG. 4, the second panel of the intermediate display which extends substantially perpendicular to the first panel also has an array of illuminatable parts or is an electronic display device so that motion of the pixelated currency notes can continue. The intermediate display thus provides a visual cue leading from the primary user display in a plane facing a user around a corner into the plane whereby a user turns to be faced with possible media dispensing and/or deposit ports.

Figure 5A:
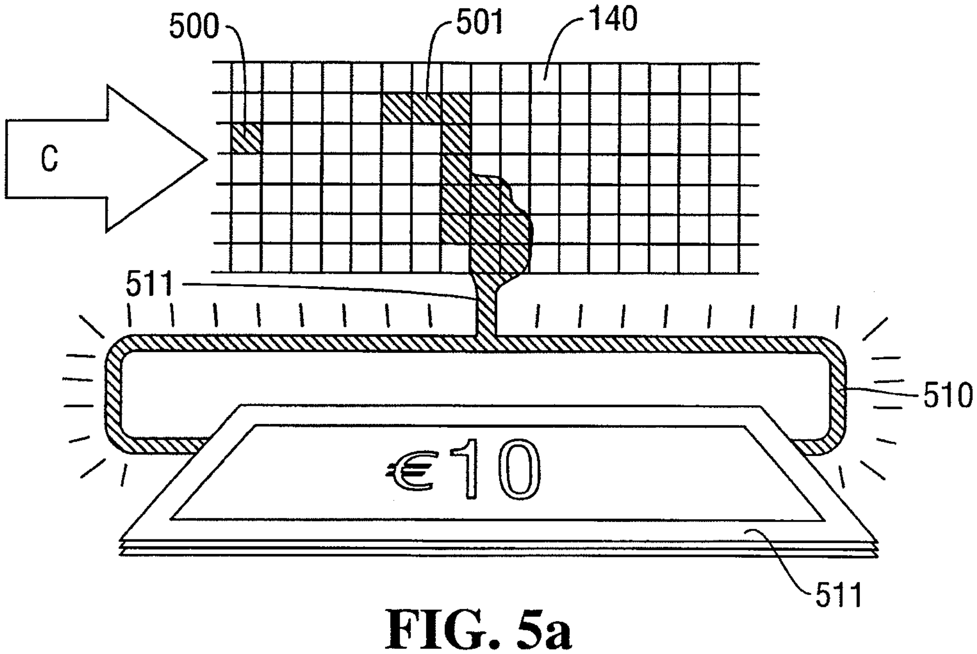
FIG. 5 illustrates display of a visual cue on a display close to a media dispensing port.

FIG. 5 helps illustrate how the port location display 140 can be utilized to identify one of the many possible ports being used in a transaction. As previously mentioned, the port location display may simply be utilized to display an arrow pointing to a particular port. However, as illustrated in FIG. 5*a*, as an option the display 140 may be utilized in a manner whereby the electronic display device is pixelated. That is to say split into a checkerboard and the pixelated parts moving from the second panel 132 of the intermediate display 130 may be made to move from the left hand side along the longitudinal length of the port location display. This is illustrated by the direction of the arrow C in FIG. 5*a*. The constant motion of pixels from left to right in the port location display tends to draw a user's eye from left to right. Thus, visual cues can sequentially or simultaneously be provided on the multiple user displays to draw a user's attention away from the primary user display across the intermediate display and eventually to a display whereby one or more further visual cues will be provided to identify a particular one port. As indicated in FIG. 5*a*, the pixelated parts 500 moving from left to right on the port location display can eventually be gathered together in a combined display 501 if, for example, a port below this combined image 501 is to be selected, the pixelated parts can then be displayed gradually becoming less rectangular to have the appearance of flowing movement. A port located adjacent to this region of the port location display (shown below in FIG. 5*a*) has a further visual cue device which, as shown in FIG. 5*a*, is a strip of lights 510 which extend around the port. By timing movement of the displayed visual cues as they flow from screen to screen and from the port location display, and timing this with the display of an illuminated light around the port (and optionally display of a connecting light 511 between a lower edge of the port location display and the illuminated strip of lights 510), a user can be directed to a desired port. For example, where three ten Euro notes, as selected by a user, are dispensed.

Figure 5B:
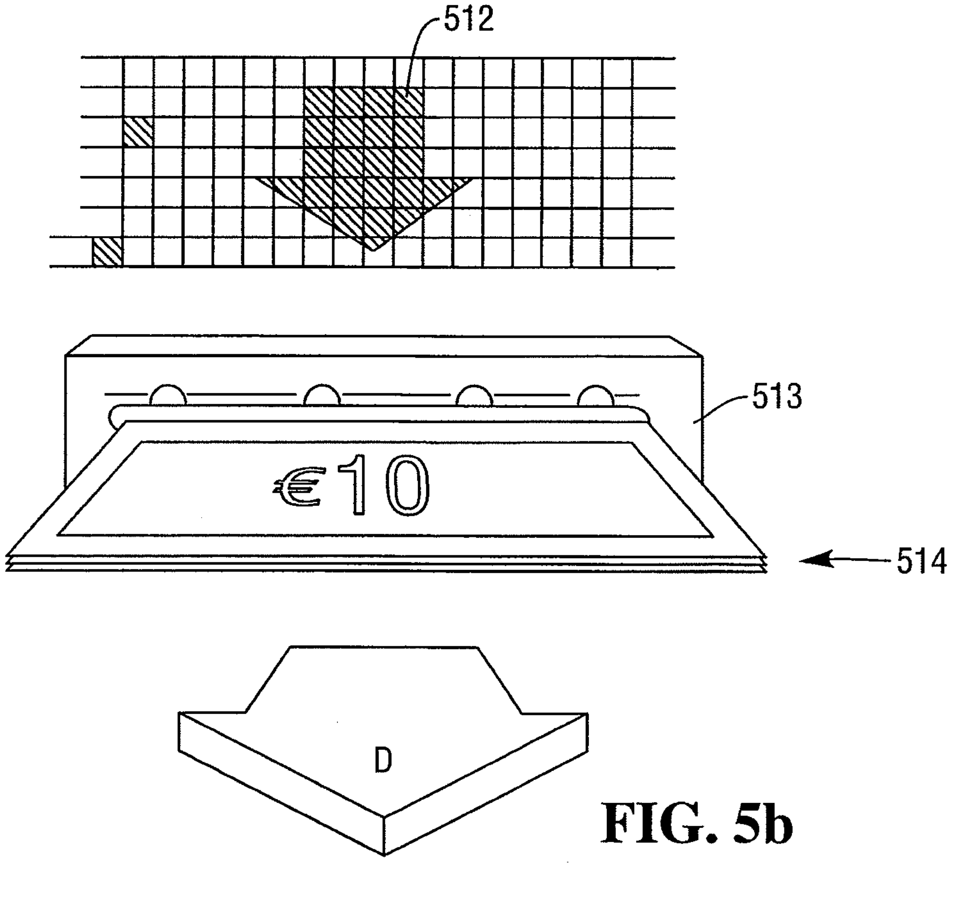
Figure 6A:
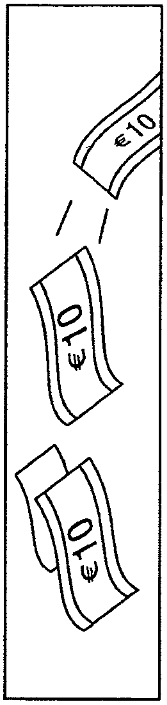
FIG. 6 illustrates options for display on a port location display.
Figure 6B:
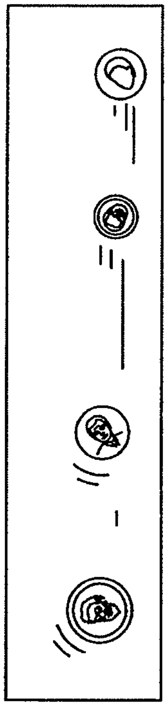
Figure 6C:
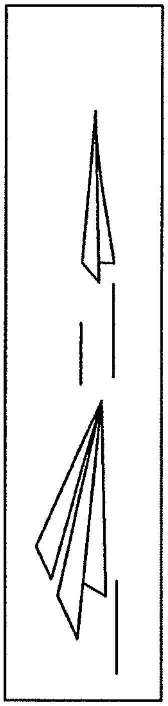
Figure 6D:
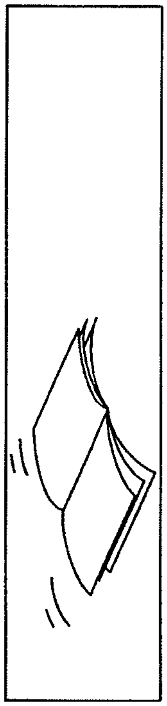
Figure 6E:
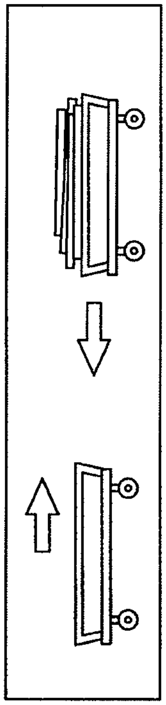

FIG. 5*b* illustrates how instead of providing a visual cue which includes the agglomeration of multiple pixels and then a flowing motion, the pixels can instead merely collect to form an arrow 512 which is displayed on the port location display. The arrow 512 is used to point towards a port 513 where a desired stack 514 of currency notes are to be dispensed. Dispensing occurs by a user grasping the bunch and removing them in the direction shown by arrow D in FIG. 5*b*.

FIG. 6 illustrates various options for the visual cue which can be displayed on the various displays. It will be understood that the displays can be the user display of the primary user interface. That is to say, a touch screen or other large display. Alternatively, the intermediate display may be utilized to display images or just pixels. Likewise, the port location display can be utilized to display images of the type shown in FIG. 6 or just have illuminating pixels.

As shown in FIG. 6, notes can be displayed and these can flutter from a first end of a display to a further end or part of the display with the general motion of the notes drawing a user's attention towards an ultimate port. Aptly, the visual cue can be a coin rolling across a display. Aptly, a visual cue can be a currency note or piece of paper such as a printer receipt folded like a paper airplane which is made to fly in a direction of a desired port. Aptly, a book that is to be deposited or dispensed can be made to fly like a bird towards a desired port. Aptly, a visual cue may be a cart carrying an item which is to be dispensed or deposited from one location towards a desired port. Certain embodiments of the present invention thus provide the solution of having a user screen of an ATM at an angle to a dispensing interface. Aptly, the angle is in the range of about around 70° to 110°. Aptly, the angle is about around 90°. This affords the benefit of front access and privacy to a user using an ATM but enables modules used to securely store and dispense items to lie within a conventional arrangement within a wall cavity. The screen content is linked dynamically and/or pictorially to the media interfaces which may thus be abstracted from the screen.

Movement of media towards the right (or indeed left) of a screen whereby it is seen to become pixelated draws the user's attention in a desired direction. A transitory interface uses lights and lenses or an electronic user display to continue the pixelated media in a desired direction. This leads through and transfers to a display close to ports where the visual cue may be enhanced in some way associated with a type of media which is being deposited or dispensed. Optionally, the connection of the primary user interface to the selected media slot is enhanced by providing for light to be seen to spill outwards of the desired port at a pre-determined moment in time. This further alerts the user to the presence of media being dispensed or a port where media is to be deposited.

Audible cues can optionally be utilized in place of or in addition to the visible cues. Optionally, user displays may be of a lens and light type. Optionally, the user displays may be an LCD screen type. A form of movement of media displayed may be unique to a type of item being dispensed or deposited. This adopts a characteristic alluding to travel or movement appropriate to the media. For example, coins roll, notes fly or a statement could take the form of a paper plane or the like.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. Apparatus for dispensing at least one item of media from one of a plurality of possible media dispensing ports, comprising:

a user interface comprising a user display;

an intermediate display adjacent to the user display; and a port location display adjacent to the intermediate display and adjacent to a plurality of possible media dispensing ports;

wherein each display is arranged to selectively display a visual cue to direct a user to a selected one of the possible media dispensing ports.

2. The apparatus as claimed in claim 1, further comprising:

each display is arranged to display a respective visual cue in a pre-determined sequence.

3. The apparatus as claimed in claim 1, further comprising:

the displayed visual cues on at least the user display and port location display are selected from a plurality of possible visual cues responsive to a type of media being dispensed.

4. The apparatus as claimed in claim 1, further comprising:

the user display comprises a touch screen.

5. The apparatus as claimed in claim 1, further comprising:

the intermediate display comprises a panel region in a first plane and a further panel region in a further plane substantially perpendicular to the first plane, each panel region comprising a plurality of pixels that selectively illuminate.

6. The apparatus as claimed in claim 1, further comprising: the port location display comprises an electronic visual display.

7. The apparatus as claimed in claim 1, further comprising: at least one light source proximate to each dispensing port, the light source associated with the selected one dispensing port being arranged to illuminate responsive to the display of a visual cue on the port location display.

8. The apparatus as claimed in claim 1, further comprising: a wall element comprising the media dispensing ports, said wall element facing a direction substantially perpendicular to a direction faced by the user display.

9. An automated teller machine (ATM) comprising the apparatus as claimed in claim 1, wherein a first media dispensing port comprises a currency note dispensing port and a second media dispensing port comprises a printed receipt dispensing port.

10. A method of dispensing at least one item of media from one of a plurality of possible media dispensing ports, comprising the steps of:

via a user interface comprising a user display, providing a user with a choice of items to be dispensed, each item being associated with a respective one of a plurality of possible media dispensing ports;

displaying a visual cue on the user display responsive to selection of an item;

displaying a visual cue on an intermediate display adjacent to the user display; and displaying a visual cue on a port location display adjacent to the intermediate display and adjacent to the plurality of possible media dispensing ports thereby indicating the media dispensing port associated with the selected item.

11. The method as claimed in claim 10, further comprising:

starting to display the visual cue on the port location display subsequent to the display of the visible cue on the intermediate display; and starting to display the visible cue on the intermediate display subsequent to the display of the visible cue on the user display.

12. The method as claimed in claim 10, wherein said step of displaying a visual cue on the user display comprises:

displaying an image of said an item on a region of a touch screen.

13. The method as claimed in claim 10, wherein said step of displaying a visual cue on the port location display comprises:

displaying a moving image on an electronic visual display, said moving image moving in a direction towards said the media dispensing port.

14. A method of dispensing or depositing items of media at one of a plurality of media ports, comprising the steps of:

responsive to a user selecting a transaction item type, providing at least one visible cue to the user extending across multiple displays to identify a media port associated with the item type.

* * * * *